(12) United States Patent
Gyongyi et al.

(10) Patent No.: US 8,959,083 B1
(45) Date of Patent: Feb. 17, 2015

(54) SEARCHING USING SOCIAL CONTEXT

(75) Inventors: Zoltan Gyongyi, Menlo Park, CA (US); Subramaniam Ganapathy, Mountain View, CA (US); Viswanath Subramanian, Bangalore (IN)

(73) Assignee: Google Inc., Mountain View, CA (US)

( * ) Notice: Subject to any disclaimer, the term of this patent is extended or adjusted under 35 U.S.C. 154(b) by 421 days.

(21) Appl. No.: 13/495,996

(22) Filed: Jun. 13, 2012

Related U.S. Application Data

(60) Provisional application No. 61/501,237, filed on Jun. 26, 2011.

(51) Int. Cl.
*G06F 17/30* (2006.01)
*G06Q 10/00* (2012.01)

(52) U.S. Cl.
USPC ............ 707/723; 707/736; 707/769; 705/319

(58) Field of Classification Search
CPC ................... G06F 17/30017; G06F 17/30023; G06F 17/30047; G06Q 50/01; Y10S 707/99933; Y10S 707/99948
USPC ................... 707/723, 736, 769, 798; 705/319
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 7,933,338 B1* | 4/2011 | Choudhry et al. | ....... 375/240.26 |
| 8,185,543 B1* | 5/2012 | Choudhry et al. | ............ 707/767 |
| 2002/0137490 A1 | 9/2002 | Gallant | |
| 2002/0143874 A1 | 10/2002 | Marquette et al. | |

(Continued)

FOREIGN PATENT DOCUMENTS

WO    WO0279984    10/2002

OTHER PUBLICATIONS

Adamic et al., "A Social Network Caught in the Web," Internet Journal, First Monday, Jun. 2, 2003, vol. 8 No. 6, pp. 1-22.

(Continued)

*Primary Examiner* — Cheryl Lewis
(74) *Attorney, Agent, or Firm* — Fish & Richardson P.C.

(57) ABSTRACT

In one aspect, a system includes: an indexing engine for indexing a plurality of sources of content, receiving a search query and returning search results; a ranking engine for ranking search results to produce ranked results, the ranking engine coupled to receive search results from the indexing engine; a modification engine for generating modified results using information from additional sources and the ranked results, the modification engine coupled to receive the ranked results from the ranking engine, the modification engine coupled to receive the information from the additional sources; and a presentation engine for sending modified results and an annotation, the presentation engine coupled to receive modified results and the annotation from the modification engine, the presentation engine coupled to provide the modified results and the annotation to a client device. The present disclosure also includes a method for retrieving social videos.

20 Claims, 8 Drawing Sheets

(56) References Cited

U.S. PATENT DOCUMENTS

| | | | |
|---|---|---|---|
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2007/0255755 | A1* | 11/2007 | Zhang et al. ............. 707/104.1 |
| 2008/0056475 | A1 | 3/2008 | Brannick et al. |
| 2008/0192656 | A1 | 8/2008 | Vagelos |
| 2009/0144392 | A1* | 6/2009 | Wang et al. ................. 709/217 |
| 2011/0087649 | A1* | 4/2011 | Sarukkai et al. ............. 707/710 |
| 2011/0098156 | A1 | 4/2011 | Ng et al. |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2810 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Comniunication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Network" WPES '05, Alexandria, Virginia, Nov. 7, 2005, pp. 71-80.

Hammond et al., "Social Bookmarking Tools (I)" D-Lib Magazine., Apr. 2005, vol. II, No. 4, ISSN 1082-9873 23 pgs.

Heer et al., "Vizster: Visualizing Online Social Network " University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al.,"Flogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.twitter.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose MarketPlace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles" Freeband, Telematica Instituut, TNO telecom, Nov. 30, 2004, 48 pgs.

Wenger et al., "Technology for Commiunities," CEFRIO Book Chapter v 5.2, Jan. 18, 2005, pp. 1-15.

* cited by examiner

SEARCHING USING SOCIAL CONTEXT

CROSS-REFERENCE TO RELATED APPLICATION

This application claims the benefit under 35 U.S.C. §119 (e) of U.S. Provisional Application No. 61/501,237, entitled "SEARCHING USING SOCIAL CONTEXT" filed on Jun. 26, 2011, the entire contents of which are incorporated herein by reference.

BACKGROUND

The present disclosure relates to searching multiple sources of data using multiple types of data. In particular, the present disclosure relates to searching web content and video content using information from social networks, video sharing sites and search engines.

The popularity and use of the Internet, web browsers, social networks and other types of electronic communication has grown in recent years. While users may have once operated their computing devices with a single browser showing a single webpage, delivering information e.g., videos and activities on social networks have developed.

A user may find it difficult to search for information across disparate systems or data sources e.g., social networks, video sharing sites, the World Wide Web, images, maps, etc. Each of these systems typically may have its own interface and own mechanism for identifying content within that data source. The amount of information available online on the web and in other private networks may also make it difficult for a user to find relevant information. Queries may be ambiguous or limited in form, and therefore, the results delivered may be ambiguous.

SUMMARY

In one innovative aspect, a system for retrieving social videos includes: a processor, and; a memory storing instructions that, when executed, cause the system to: receive a query from a user; obtain social context information about interaction of the user from multiple sources; obtain a search result using the query; modify a ranking of the search result based on the social context information to produce a modified search result; generate an annotation for at least one search result where the annotation indicates an association with a particular source and a relation to the user; and provide the modified search result and the annotation for presentation.

The present disclosure also includes a method for retrieving social videos including the steps of receiving a query from a user; obtaining social context information about interaction of the user from multiple sources; obtaining a search result using the query; modifying a ranking of the search result based on the social context information to produce a modified search result; generating an annotation for at least one search result where the annotation indicates an association with a particular source and a relation to the user; and providing the modified search results and the annotation for presentation.

One or more of the implementations described can also include the following features: multiple sources that include web content and video content; a single search over a unified index of video content and web content; a plurality of searches, one over an index of video content and a second over an index of web content; additional information signals that include social context information; the additional information signals that include video context information; the annotation that is social information about the at least one search result; sending formatting information about the search result and the annotation; sending a section divider that is a selectable link for retrieving additional results modified in rank by the additional information signals; the plurality of sources of content that include a web index and a video index; the presentation engine receiving a query and an indication of an identity of the user in a social network; the additional information that is one from the group of a social graph, social content and social video content; a pipeline for processing information from a social graph, social web content and social video content and producing data and signals used for modifying the ranked results; the indexing engine including a web index and the pipeline generating social data that is added to the web index; the indexing engine including a video index and the pipeline generating social data that is added to the video index; the presentation module that includes a social annotation presentation module for presenting the social annotation to the user; the presentation module that generates and sends a section divider that is a selectable link for retrieving additional results modified in rank by the additional information; the modification engine that includes a video context signaler for generating signals to modify the ranking of search results based upon video information.

The systems and methods disclose below are advantageous in a number of respects. First, they are able to provide more relevant search results to users by including information about a user's social context, e.g., from a social network in the search query. Second, they are able to modify the rankings of search results based on social context information thereby making content provided by other users connected to the searcher appear higher in the results. Third, they are able to present the search results in a unified interface that clearly delineates search results that have a social annotation.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
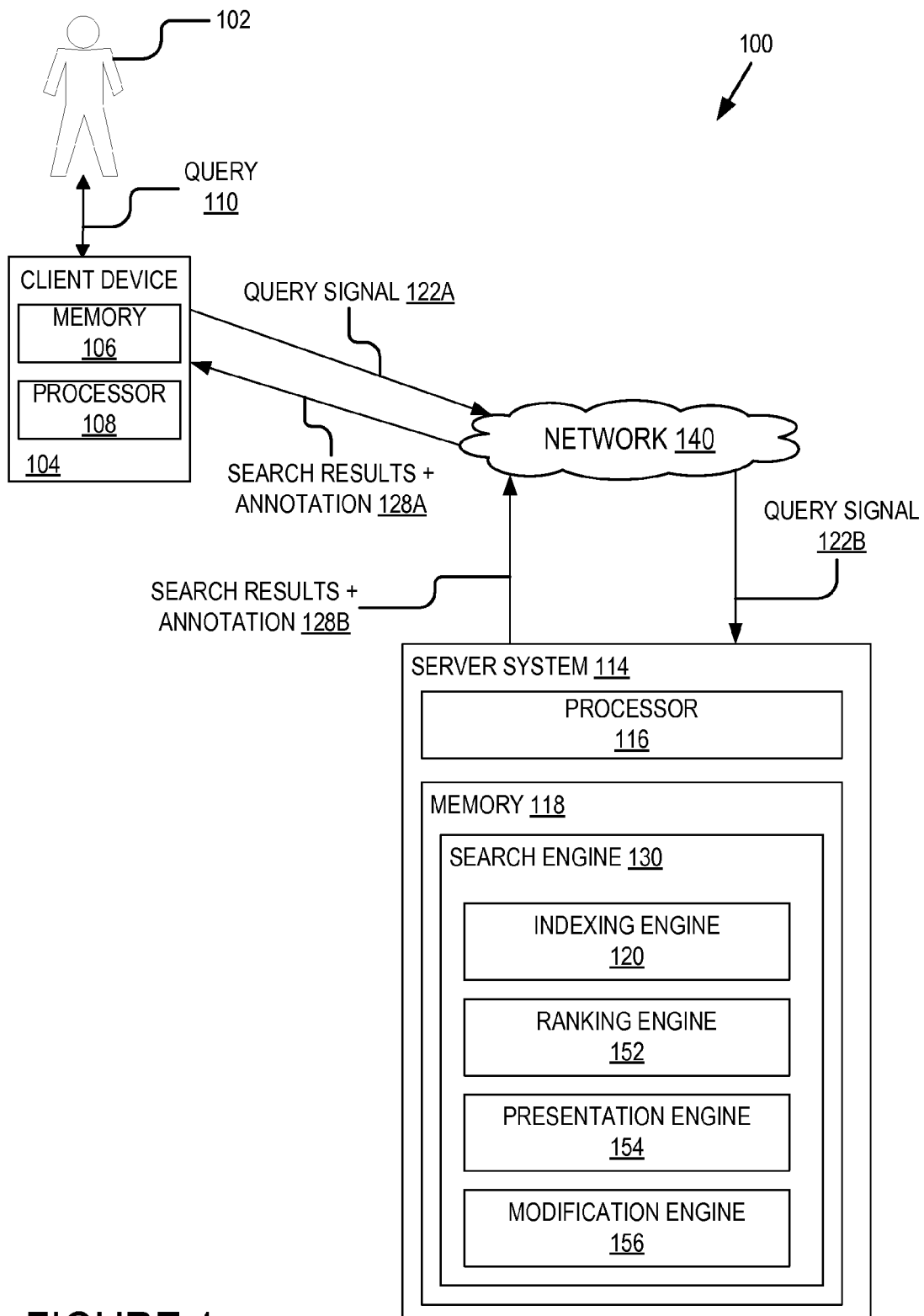
FIG. 1 is a block diagram illustrating a system for retrieving social videos according to a first implementation of the present disclosure.

FIG. 1 illustrates one implementation of a social video search system 100. The social video search system 100 comprises a client device 104, a network 140 and a server system 114. The client device 104 is utilized by a user 102 to input a query 110 to retrieve information from the server system 114. The client device 104 is coupled for communication with the network 140 which in turn is coupled for communication with the server system 114.

Although only a single user 102, client device 104, network 140 and server system 114 are illustrated, any numbers of client devices 115 can be available to any number of users. Furthermore, while only one network 140 is coupled to the client device 104 and the server system 114 in practice any number of networks 140 can be connected to the system. Additionally, while only one server system 114 is shown, the social video search system 100 could include one or more server systems 114. Moreover, while the present disclosure is described below primarily in the context of activities related to videos and a social network, the present disclosure is applicable to any type of online communications with multiple data sources and multiple data types.

The client device 104 comprises a memory 106 and a processor 108. The client device 104, for example, may be a personal computer, a laptop computer, a tablet computer, a mobile phone (e.g., a smart phone) or any other computing device.

The memory 106 stores instructions and/or data that may be executed by the processor 108. The memory 106 is coupled to a bus for communication with the other components. The instructions and/or data may comprise code for performing any and/or all of the techniques described herein. The memory 106 may be a dynamic random access memory (DRAM) device, a static random access memory (SRAM) device, flash memory or some other memory device known in the art.

The processor 108 comprises an arithmetic logic unit, a microprocessor, a general purpose controller or some other processor array to perform computations and provide electronic display signals to a display device. The processor 108 is coupled to a bus for communication with the other components. Processor 108 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. Other processors, operating systems, sensors, displays and physical configurations are possible.

The client device 104 is configured for communication with the network 140. In response to user input, the client device 104 generates and sends a search query, e.g., in the form of a query signal 122A, to the network 140. The network 140 receives and passes on the query signal 122B to the server system 114. The server system 114 processes the query signal 122B as will be described in more detail below to generate search results and one or more annotations. The server system 114 sends the search results and annotations 128B to the network 140 which in turn sends the search results and annotations 128A to the client device 104 for presentation to the user 102.

The network 140 can be wired or wireless, and may have any number of configurations, e.g., a star configuration, token ring configuration or other configurations known to those skilled in the art. Furthermore, the network 140 may comprise a local area network (LAN), a wide area network (WAN) (e.g., the Internet), and/or any other interconnected data path across which multiple devices may communicate. In some implementations, the network 140 may be a peer-to-peer network. The network 140 may also be coupled to or includes portions of a telecommunications network for sending data in a variety of different communication protocols. In some implementations, the network 140 includes Bluetooth communication networks or a cellular communications network for sending and receiving data, e.g., via short messaging service (SMS), multimedia messaging service (MMS), hypertext transfer protocol (HTTP), direct data connection, wireless application protocol (WAP), email, etc.

The server system 114 comprises a processor 116 and a memory 118. The processor 116 is similar to the processor 108 described above; however, it may have increased computing capability. The memory 118 is similar to the memory 106 described above; however, it may be larger in size, have faster access time, and also include volatile and nonvolatile memory types.

In some implementations, the memory 118 stores a search engine 130 that includes: an indexing engine 120, a ranking engine 152, a presentation engine 154; and a modification engine 156. The search engine 130 is operable on the processor 116 to receive the query signal 122 and in response return search results and annotations 128.

One or more of the search engine 130, the indexing engine 120, the ranking engine 152, the presentation engine 154 and the modification engine 156 are stored in the memory 118 and are accessible and executable by the processor 116. In some implementations, one or more of the search engine 130, the indexing engine 120, the ranking engine 152, the presentation engine 154 and the modification engine 156 store data that, when executed by the processor 116, causes these engines to perform the operations described below. In some implementations, one or more of the search engine 130, the indexing engine 120, the ranking engine 152, the presentation engine 154 and the modification engine 156 are instructions executable by the processor 116 to provide the functionality described below with reference to FIGS. 3-7.

The indexing engine 120 is software or routines for creating an index or indices for multiple sources of content. In some implementations, the indexing engine 120 indexes video data and web data. The indexing engine 120 collects, parses and stores data to facilitate information retrieval. The indexing engine 120 also processes search queries. The indexing engine 120 receives a search query and returns search results from the data sources that match the terms in the search query. The indexing engine 120 is coupled to receive a search query from the presentation engine 154.

The ranking engine 152 is software or routines for ranking search results based upon relevance to the user. The ranking engine 152 is coupled to receive the search results from the indexing engine 120. The ranking engine 152 reorders the search results based upon terms in the query as well as other factors about the user. In some implementations, the ranking engine 152 is coupled for communication with the modification engine 156 to modify the ranking of the search results based on input signals from the modification engine 156. In some implementations, the modified search results are output from the ranking engine 152 to the presentation engine 154. In some implementations, the reordered results output by the ranking engine 152 are output to the modification engine 156, which further reorders the results and then provides them to the presentation engine 154.

The presentation engine 154 is software or routines for receiving a query signal and sending the query signal to the indexing engine 120. The presentation engine 154 is coupled to the indexing engine 120 to provide the query signal. The presentation engine 154 also receives search results from the ranking engine 152 or the modification engine 156. The presentation engine 154 formats and sends the search results via the network 140 to the client device 104. In some implementations, the presentation engine 154 also receives social annotations in addition to or as part of the search results. The presentation engine 154 formats and sends these social annotations for presentation on the client device 104. Some implementations of the formatting and presentation of these social annotations are shown and described below with reference to FIGS. 5-7.

The modification engine 156 is software or routines for modifying the ranking of search results. The modification engine 156 is coupled to receive other types of information, e.g., public information about a user social graph, public information about user interaction with the social network, user interaction with a video sharing site, or any other system with which a user may interact for example but not limited to micro-blogs, comments, votes (e.g., indicating approval of particular content), other indications of interest (e.g., that promote content for consumption by other users), playlists (e.g., for video or music content). In some implementations, users may be provided options to opt-in or opt-out of having this type of information being used. In some implementations, the modification engine 156 receives social information and video information for modifying the ranking of search results. The present disclosure will be described below in the context where the search results identify videos; however, the principles and concepts of the disclosed technologies can be applied to any other type of search results, e.g., as search results that identify other types of web content or resources, e.g., images, web pages, etc. The modification engine 156 modifies the ranking of the search results using the social information and video information. The re-ordered search results are sent from the modification engine 156 to the presentation engine 154.

In some implementations, the modification engine 156 utilizes the interactions of the user with video content, the social network content (or other users in the social network), or web content to make modifications in the ranking of search results. The timing or freshness of these user interactions may be used as a signal to rank particular content higher than other content. For example, if a particular action was taken by the user to interact with another user on the social network, or a friend of the user performs an action on content in the social network in a recent predetermined amount of time (e.g., within the last hour) that information can be used by the modification engine 156 to rank particular content higher than other content. Furthermore, that same information can be used in creating the annotation 226 by the social annotation presentation module 224. Moreover, in some implementations, other modules of the system 200 may use these user interactions for performing their functions are related functions.

Figure 2:
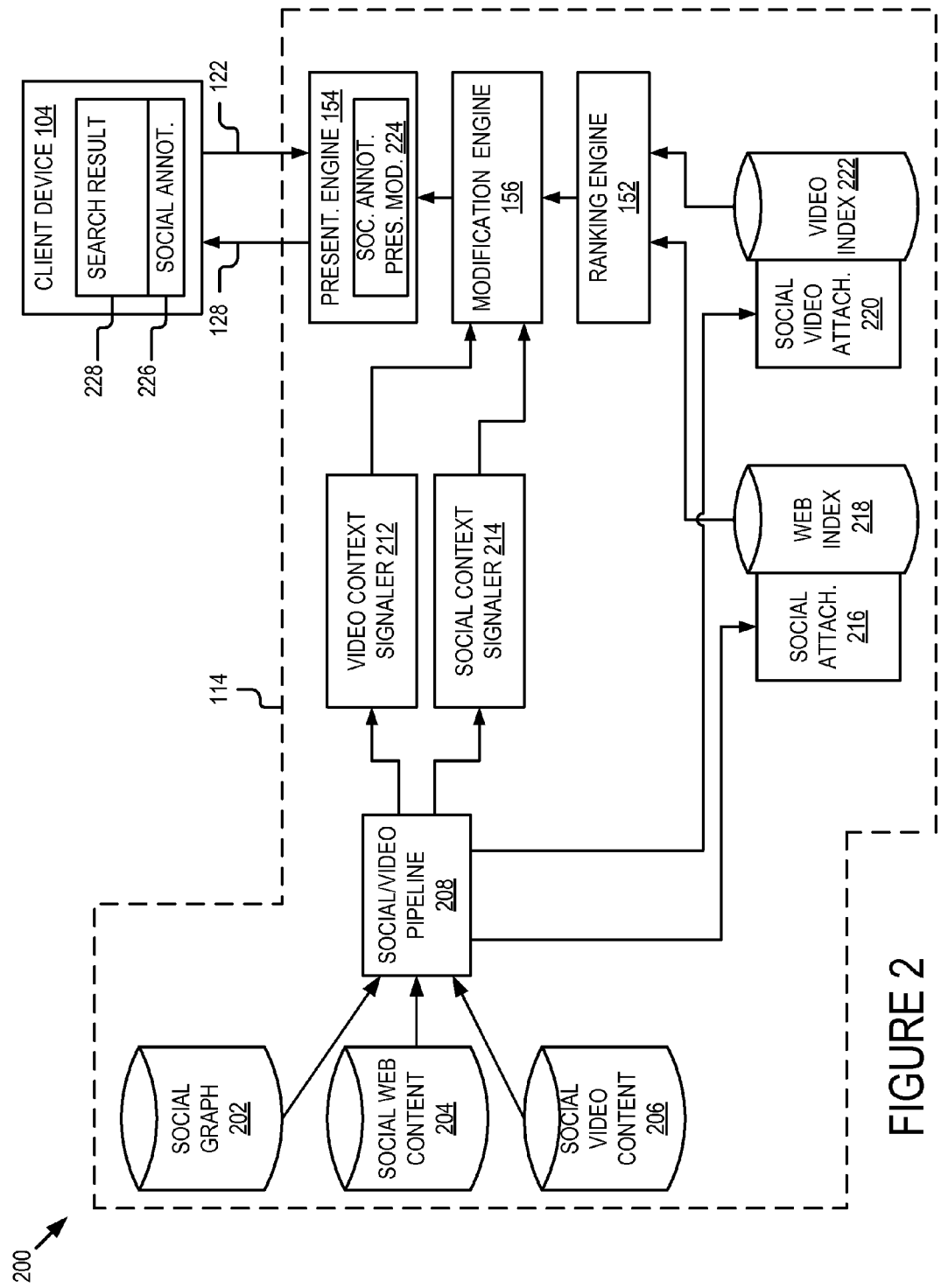
FIG. 2 is a block diagram illustrating a system for retrieving social videos according to a second implementation of the present disclosure.

Referring now to FIG. 2, a second implementation for the social video search system 200 is described. As shown, the second implementation for the social video search system 200 comprises: a social graph 202, social web content 204, social video content 206, a social/video pipeline 208, a video context signaler 212, a social context signaler 214, a social attachment 216 for the web index 218, the social video attachment 220 for the video index 222, the ranking engine 152, the modification engine 156, and the presentation engine 154 including a social annotation presentation module 224.

The social graph 202 is a database storing information about social connection details between users 102. Users 102 are any potential searchers and their contacts. Users 102 may be internal to the social video search system 200 (e.g., having an account for an associated search service), or external (e.g., having an account with a micro blogging site or social network). For example, users can be identified by an account with a search engine provider (as may be identified by their account for the search engine provider) and their internal (through other services provided by the search engine provider) and external (through services provided by other providers) contacts. In some implementations, the social graph 202 also includes any activity taken on a social network or multiple social networks that are accessible via application interfaces. Connections are derived from public information collected from web pages (e.g., list of micro blogging followers) as well as private information provided (and approved) by the internal users. The social graph 202 is coupled to provide information to the social/video pipeline 208.

The social web content 204 is a database that lists for social users the content that is either their own (created, uploaded, etc. by them) or was endorsed by them (e.g., mentioned in one of their micro-blogs or blog posts, commented on, voted for, etc.). For example, the social web content 204 includes any information from a social network, micro blogging site, news feeds, e.g., annotations, comments, posts, recommendations, endorsements, like, dislikes, etc. The social web content 204 is coupled to provide this information to the social video pipeline 208.

The social video content 206 is similar to the social web content 204 but for videos. In some implementations, the social video content 206 includes information specific to videos (e.g., likes or dislikes), as well as user-content connection types specific to videos (e.g., the fact that some user added the video to one of his/her public playlist). The social video content 206 is coupled to provide this information to the social/video pipeline 208.

The social/video pipeline 208 is software or routines for processing information from the social graph 202, the social web content 204 and the social video content 206. The social/video pipeline 208 receives or retrieves information from the social graph 202, the social web content 204 and the social video content 206 and produces data signals that are used for retrieving, ranking and presenting social results in response to search queries. The social/video pipeline 208 is coupled to provide ranking information to the video context signaler 212 and the social context signaler 214. The social/video pipeline 208 is also coupled to provide data for use in retrieving or presenting search results to the social attachment 216 for the web index 218 and the social video attachment 220 for the video index 222.

The video context signaler 212 is software and routines for generating signals to modify the ranking of search results based upon video information. In some implementations, the video context signaler 212 is coupled to receive additional social data for videos from the social/video pipeline 208. The video context signaler 212 processes these signals to modify the ranking of the search results. The video context signaler 212 is coupled to provide its output to the modification engine 156.

The social context signaler 214 is software and routines for generating signals to modify the ranking of search results based upon social context information. In some implementations, social context information includes any information external or internal from a social graph of a user, social activities of the user, activities of contacts of the user, etc. In some implementations, the social context signaler 214 receives additional information from the social/video pipeline 208 that enables differential ranking of social search results and the assembly of social result annotations. The social context signaler 214 is coupled to receive input from the social/video pipeline 208. The social context signaler 214 provides its output and is coupled to the modification engine 156. In some implementations, the social context signaler 214 and the video context signaler 212 are combined into a single module.

The social attachment 216 for the web index 218 is social data that is added to the web index 218. The terms social data, social context and social information are used throughout this application to refer to the same thing. In some implementations, the social data is any social context or social information for a user on any system, internal or external. For example, the social data includes a user's social graph, activities of the user, actions taken on a social network, activities of contacts of the user, information e.g., comments, posts, endorsements, sharing, re-sharing, likes, dislikes, blogs, responses, etc. The social attachment 216 enables the identification and retrieval of web documents matching the query that are socially relevant for the particular searcher (identified by the user's account) performing the search. The social attachment 216 is received from the social/video pipeline 208.

The social video attachment 220 for the video index 222 is social data that is added to the video index 222. Again, like the social attachment 216, the social video attachment 220 enables the identification and retrieval of videos matching the query that are socially relevant for the particular searcher (identified by the user's account) performing the search. The social video attachment 220 is received from the social/video pipeline 208.

The ranking engine 152 is coupled to retrieve information from the web index 218 and the video index 222. Further, the ranking engine 152 ranks search results based upon relevance to the user. The ranking engine 152 outputs ranked search results to the modification engine 156.

The modification engine 156 is coupled to receive the ranked search results from the ranking engine 152. The modification engine 156 modifies the ranked search results to generate modified search results. The modification engine 156 is coupled to receive modifications signals from the video context signaler 212 and the social context signaler 214. The modification engine 156 uses these signals to modify the ranked search results to produce the modified search results.

The social annotation presentation module 224 is software or routines for presenting the social annotation to the user. The social annotation presentation module 224 generates the user interfaces as will be described below with reference to FIGS. 5-7. The social annotation presentation module 224 cooperates with the ranking engine 152 to receive search results (web content or video content) including annotation information. In some implementations, annotation information can be any social data, video data or data from other sources used to query the results, modify the ranking of the results, or to give context to the results and why they are appearing in response to a query. A social annotation is the presentation of social annotation information in juxtaposition to the search results. The social annotation presentation module 224 creates the social annotation as presented to the user on the search results page. The social annotation presentation module 224 combines the social annotation with the search results. The social annotation presentation module 224 can add the social imitation to web content search results or videos that are returned in search results. The social annotation presentation module 224 is coupled to receive information from the ranking engine 152 and coupled to provide search results 228 to the client device 104. The search results 228 and social annotation are positioned proximate to each other in some implementations.

Figure 3:
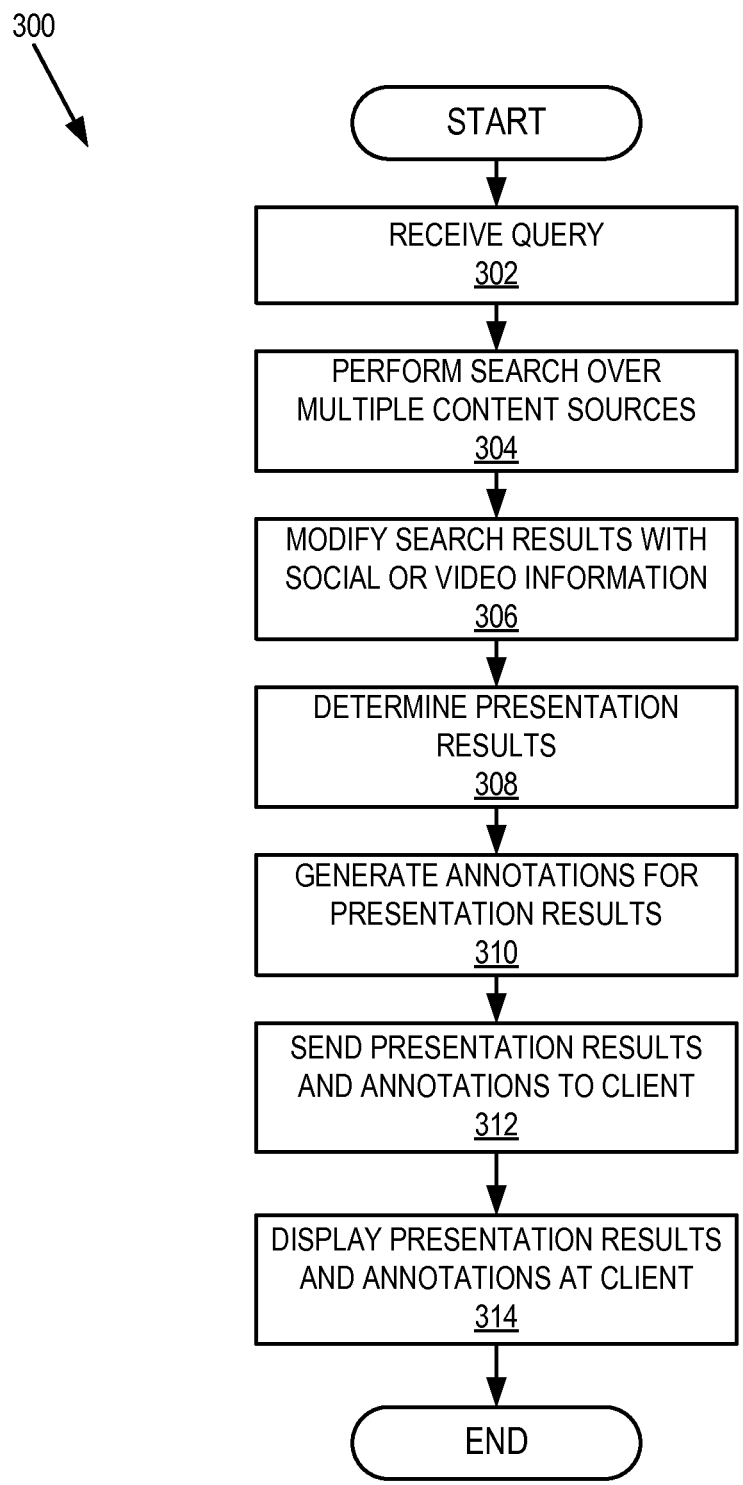
FIG. 3 is a flowchart of a method for retrieving social videos according to a first implementation of the present disclosure.

Referring now to FIG. 3, an implementation of a method 300 for retrieving social videos is described. The method 300 begins with the server system 114 receiving 302 a query. The search engine 130 performs 304 a search over multiple content sources. In some implementations, a single search is performed over multiple content sources. In some implementations, multiple searches, one for each content source, are performed. Next, the modification engine 156 modifies 306 the search results with social and/or video information. Then a predetermined number of highest ranked search results are selected 308 for presentation. Next, annotations corresponding to the presentation results are generated 310. It should be understood that social annotations may not exist in the search results for all queries for all users. They will only exist for some queries for some users. Thus, annotations are only created for search results that have associated social content and are ranked high enough. The ranking of the search results are modified based on social context, but there may not be any social content for that given query or the content might not rank highly enough to show in search results. The annotations and presentation results are sent 312 from the server system 114 to the client device 104. Finally, the method 300 completes by displaying 314 the presentation results and annotations at the client device 104.

Figure 4A:
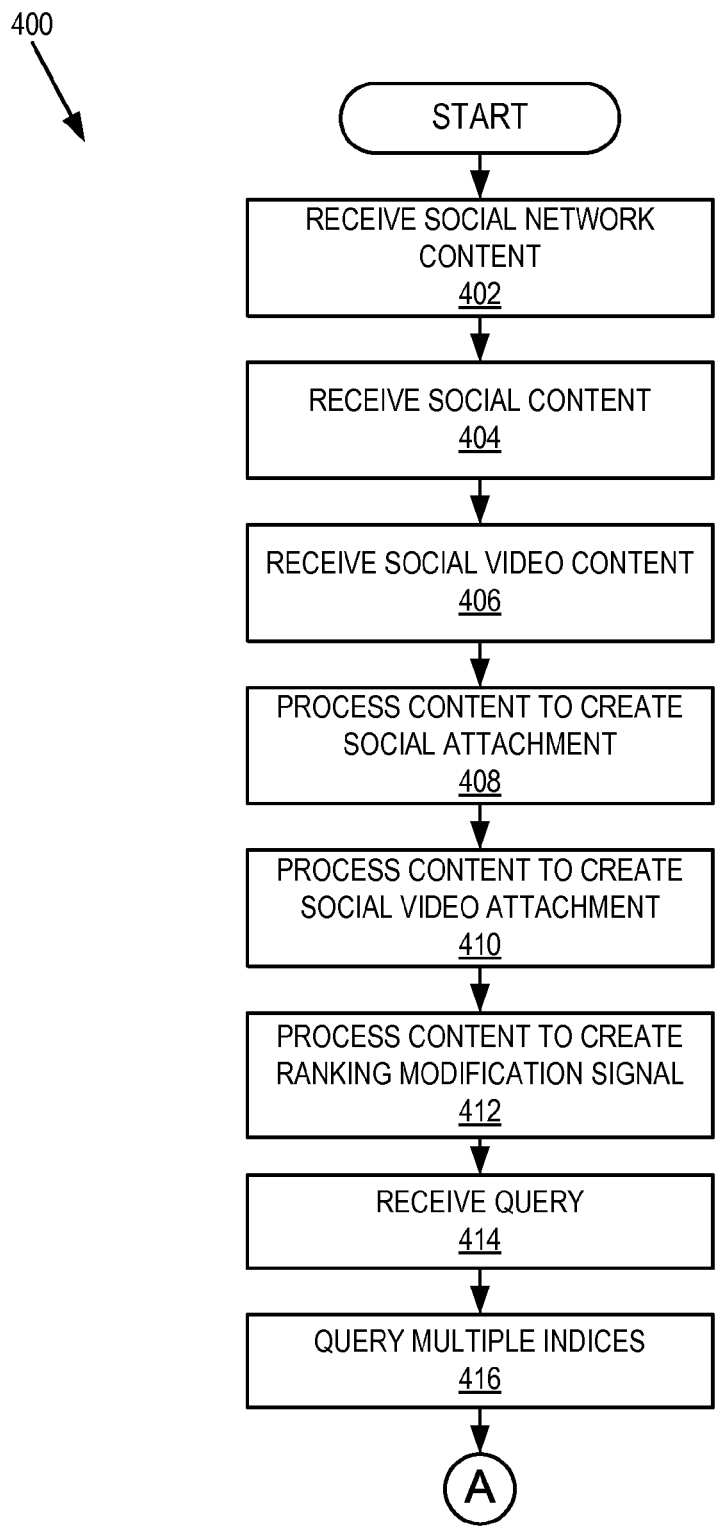
FIGS. 4A and 4B are a flowchart of a method for retrieving social videos according to a second implementation of the present disclosure.
Figure 4B:
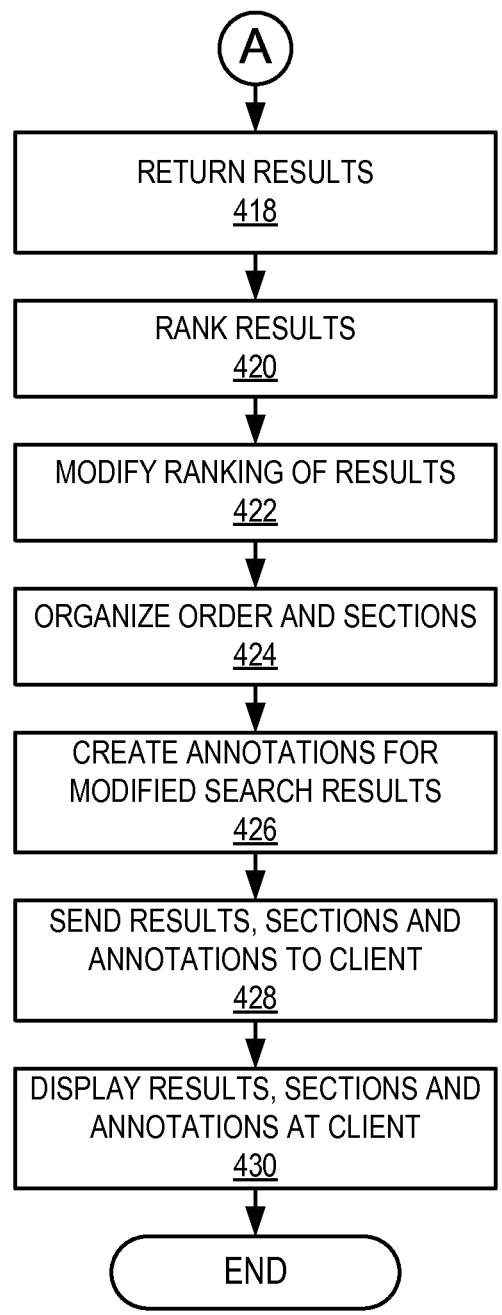

Referring now to FIGS. 4A and 4B, a method 400 for retrieving social videos is described. The method 400 begins by receiving or retrieving 402 social network content, e.g., the social graph. Then the method receives or retrieves 404 social web content. Next, the method receives or retrieves 406 social video content. The method continues by processing 408 the social network content, the social web content and the social video content to generate social attachment information. The social attachment information is provided or added to the web index 218. The method also processes 410 the social network content, the social web content and the social video content to generate social video attachment information. The social video attachment information is provided or added to the video index 222. The social network content, the social web content and the social video content are also used to create 412 a ranking modification signal that is sent to the ranking engine 152. Next, the method receives 414 a query. The query is applied 416 to multiple indices, e.g., the web index 218 and the video index 222. Referring now also to FIG. 4B, the application of the query to the indices returns 418 search results. The search results are ranked 420 by the ranking engine 152. The ranking is modified 422 based upon the ranking modification signal. The modification also includes the addition of social information to the search results. The modified search results are organized 424 in the modified order and sections are added. Then the method creates 426 annotations for the search results. The modified search results, the sections and the annotations are sent 428 from the server system 114 to the client device 104. The client device 104 then displays 430 the modified search results, the sections and the annotations to the user 102.

Figure 5:
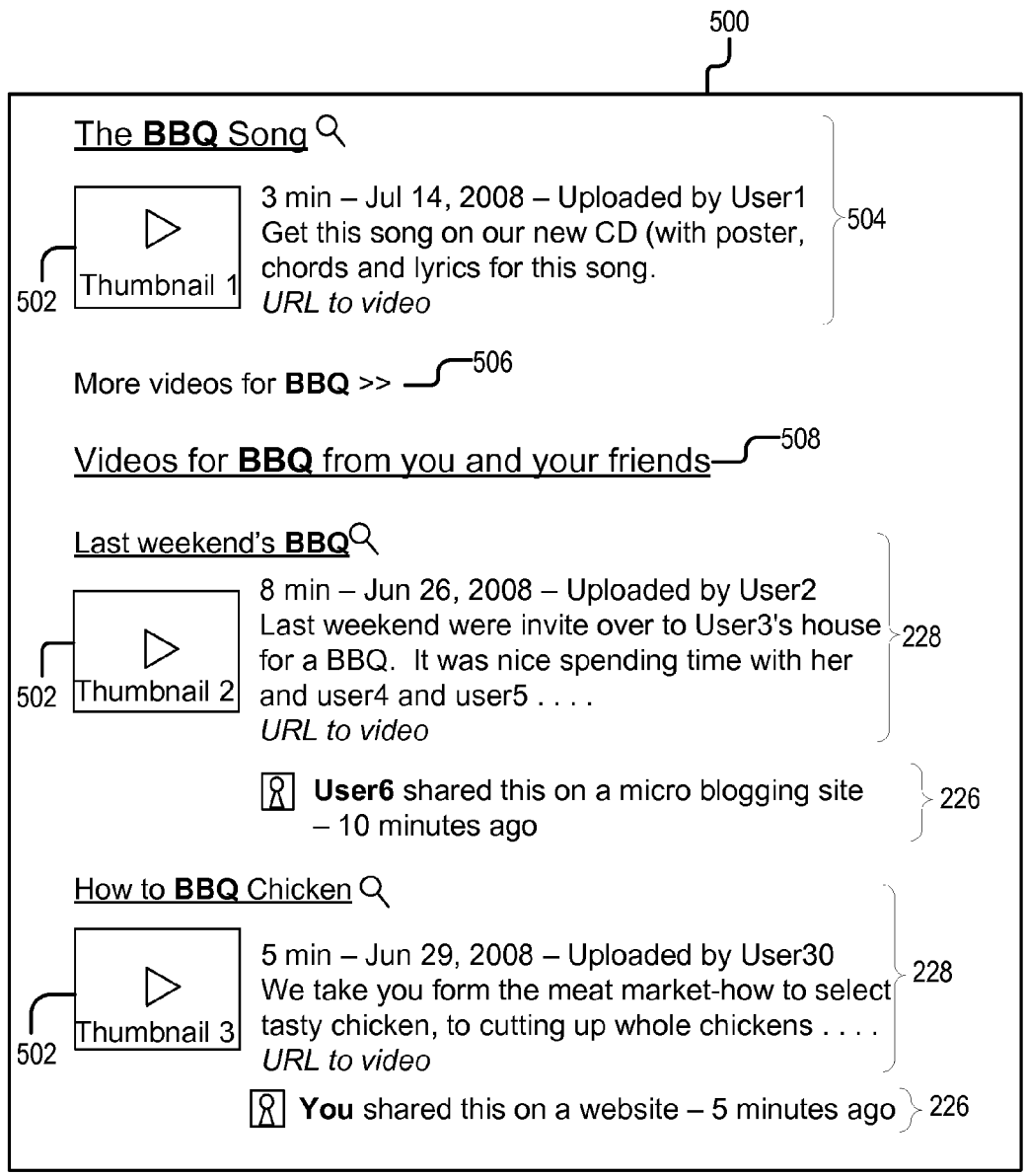
FIGS. 5-7 are graphic representations of implementations of user interfaces for presenting social videos according to some implementations of the present disclosure.
Figure 6:
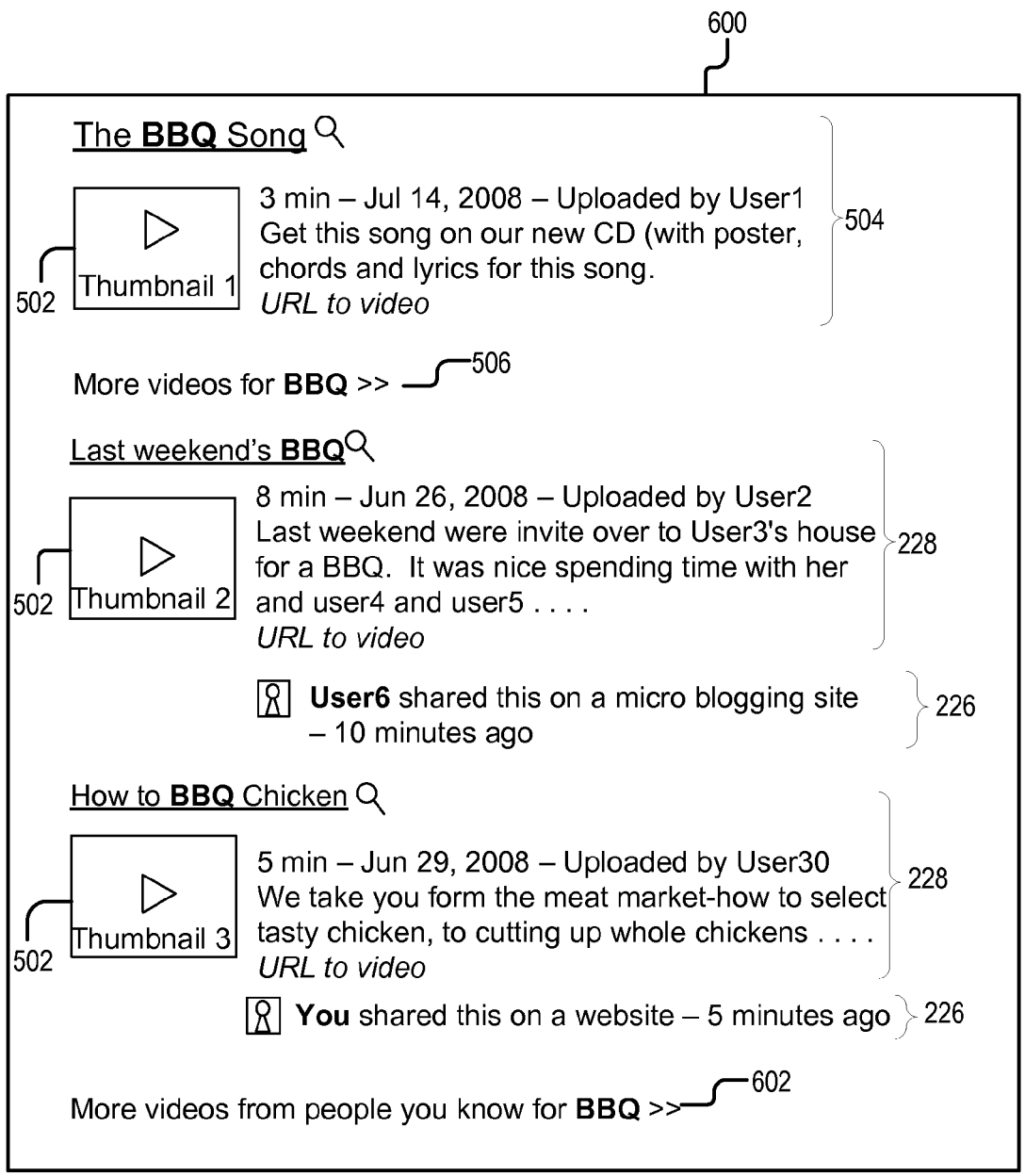
Figure 7:
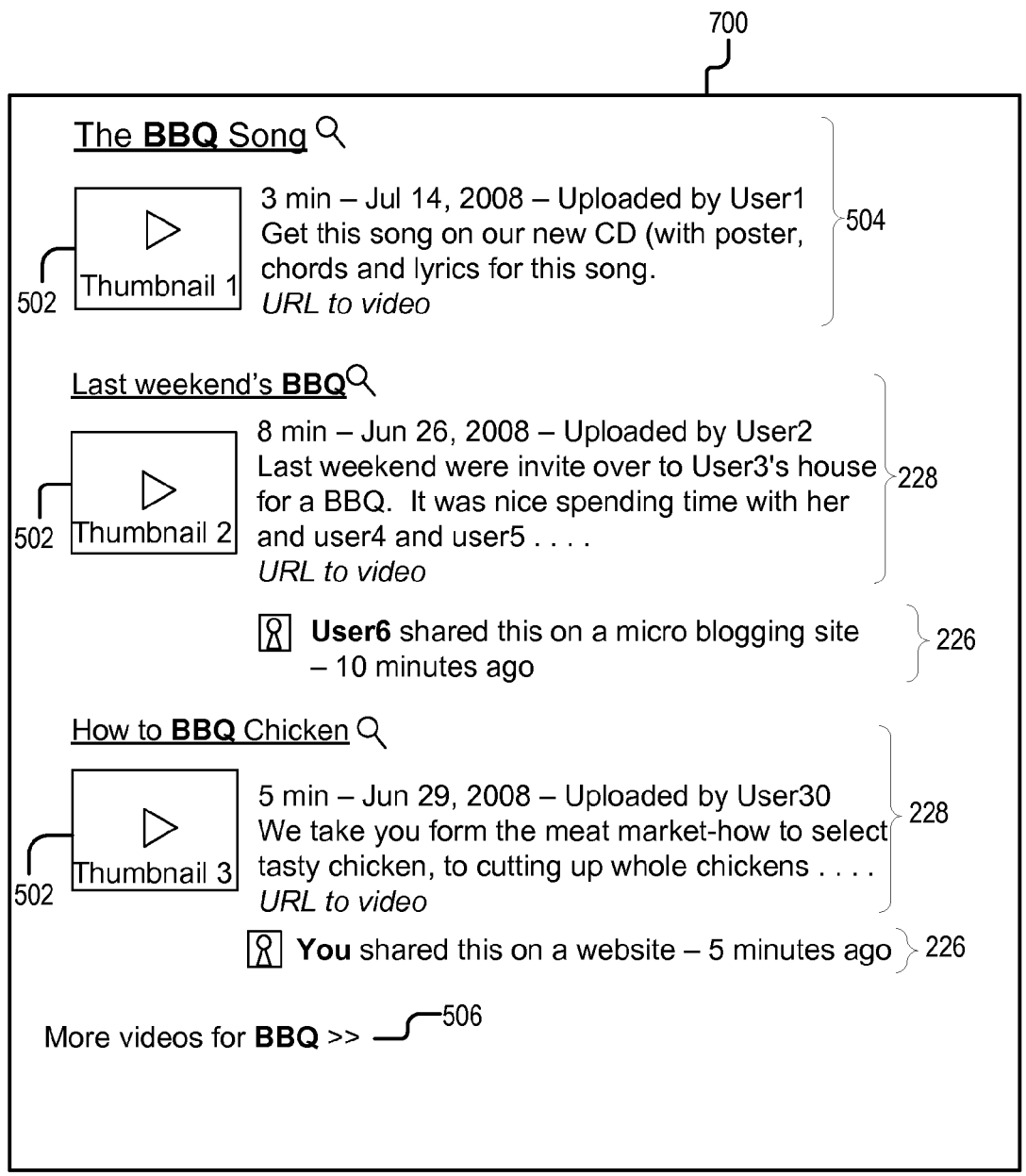

Referring now to FIGS. 5-7, some implementations for presenting search results, in particular videos with annotations are shown.

FIG. 5 illustrates one implementation of a user interface 500 in which search results for videos are shown in a browser window. In this example, three search results are returned in response to a query for the term "BBQ."

The first search result 504 includes a heading, information about the video, e.g., its duration, when the video was uploaded and who uploaded the video. The information also includes an abstract of information related to the video and a thumbnail image 502 representative of the video. The first search result 504 also includes an active link including the Uniform Resource Locator (URL) to the video.

This user interface 500 is particularly advantageous because the search results are ordered and include both video content generally available, e.g., search result 504 as well as other search results 228 that are particularly relevant to the searcher/user 102 based upon social information about the user. For example, the last two search results 228 include typical information, e.g., as caption, thumbnail image 502, duration, date of uploading, user that uploaded the video and URL to the video. Additionally, the search results include a social annotation 226 identifying that "user6 shared this video on a micro-blogging site 10 minutes ago." This identifies for the user why this video search result is relevant to the user 102. In some implementations, the social annotation 226 includes an indication about the owner or endorser of content in relation to the searcher. More specifically in this case, the second search result is being presented because in the social network or social graph of the searcher, User6 is an external or internal friend (or friend of a friend) identified as someone that is important to the searcher in the social context. Since User 6 has shared this video, the video ends up being ranked higher in the search results. Furthermore, the social annotation 226 may indicate timing or freshness information as in this case where the annotation 226 indicates that a user related to the viewer shared the video 10 minutes ago. The timing of a user's interaction with other users or other content can be provided as information in the annotation as well as used to determine which annotations to reveal or surface. Similarly, the third search result includes an annotation 226 about social activity that the user has taken. Various types of additional social information can be added, e.g., information about whether videos were shared, whether a friend likes or dislikes a particular video, or any other social information related to a particular video. It should be understood that the second and third search results are included in the search results for very different reasons. The second result is included because User6 has taken a social action, sharing, and User6 is important or included in the social graph of the searcher. In contrast, the third result is included because it is content that the searcher, "You," created and also shared. It is included because the searcher is the source, but also because he/she took a social action, sharing, and because it relates to the search term "BBQ."

Some implementations of the user interface 500 also include a link 506 to access additional videos related to the search. The user interface 500 also provides a second link 508 to retrieve additional videos related to the search term and limited to video content from other users in the social network of the user 102. This user interface 500 is particularly advantageous because the second link 508 also acts as a section header to visually segregate the videos that were returned by general searching versus the videos that were returned due to additional social context information.

FIG. 6 illustrates a second implementation of the user interface 600 in which search results for videos are shown in a browser window. In this user interface 600, the same three search results as shown above in FIG. 5 are presented. However, the user interface 600 stacks the video search results and the section divider is provided as a footer. Again, the user interface 600 includes a link 506 to retrieve more videos about the search term. This link 506 also serves to segregate the video results returned generally versus the video results returned because of added social context information. In some implementations, the second link 602 is positioned at the bottom of the stack of search results as a footer. It should be noted that the general video search results versus the social video search results are easily distinguishable because of the social annotations 226 provided beneath each search result, where applicable.

FIG. 7 illustrates a third implementation of the user interface 700 in which search results for videos are blended together according to their modified rank. As compared with FIGS. 5 and 6, it can be seen that there is no second link to access socially relevant videos. The ranking of the video search results are merged together in a single stack. However, a link 506 is provided to retrieve additional videos related to the search term.

A system for retrieving social videos has been described is described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one implementation below with reference to user interfaces and particular hardware. Moreover, the technologies disclosed above primarily in the context of a social network; however, the disclosed technologies apply to other data sources and other data types (e.g., collections of other resources, e.g., images, audio, web pages) that can be used to refine the search process.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to an implementation in any specific programming language, or for any specific operating system or environment. Accordingly, the disclosure of the present techniques and technologies is intended to be illustrative, but not limiting.

What is claimed is:

1. A computer-implemented method executed by one or more processors of a social video search system, the method comprising:
   receiving a query from a user;
   obtaining, by the one or more processors, social context information about interactions of the user from a social graph;
   obtaining, by the one or more processors, a search result using the query;
   modifying, by the one or more processors, a ranking of the search result based on an association with a particular source and a relation to the user to produce a modified search result;
   generating, by the one or more processors, an annotation for at least one search result where the annotation indicates the association with the particular source and the relation to the user; and
   providing, for display to the user, the modified search result and the annotation for presentation.

2. The method of claim 1 wherein the multiple sources include web content and video content.

3. The method of claim 1 wherein obtaining the search result is a single search over a unified index of video content and web content.

4. The method of claim 1 wherein obtaining the search result is a plurality of searches, one over an index of video content and a second over an index of web content.

5. The method of claim 1 wherein the social context information includes information about interaction of the user with other users.

6. The method of claim 1 wherein the social context information includes information about timing of when the user interacted with one of the multiple sources.

7. The method of claim 1 wherein the social context information include video context information.

8. The method of claim 1 wherein the annotation is social information about the at least one search result.

9. The method of claim 1 comprising sending formatting information about the search result and the annotation.

10. The method of claim 1 further comprising sending a section divider that is a selectable link for retrieving additional results modified in rank by the social context information.

11. A social video search system comprising:
   a processor, and; a memory storing instructions that, when executed,
   cause the system to:
      receiving a query from a user;
      obtaining social context information about interactions of the user from a social graph;
      obtaining a search result using the query;
      modifying a ranking of the search result based on an association with a particular source and a relation to the user to produce a modified search result;
      generating an annotation for at least one search result where the annotation indicates the association with the particular source and the relation to the user; and providing, for display to the user, the modified search result and the annotation for presentation.

12. The system of claim 11, wherein the multiple sources include web content and video content.

13. The system of claim 11, wherein the search result is a single search over a unified index of video content and web content.

14. The system of claim 11, wherein the search result is a plurality of searches, one over an index of video content and a second over an index of web content.

15. The system of claim 11, wherein the social context information includes information about interaction of the user with other users.

16. The system of claim 11, wherein the social context information includes information about timing of when the user interacted with one of the multiple sources.

17. The system of claim 11, wherein the social context information include video context information.

18. The system of claim 11, wherein the annotation is social information about the at least one search result.

19. The system of claim 11, wherein the instructions also cause the system to:
send formatting information about the search result and the annotation.

20. The system of claim 11, wherein the instructions also cause the system to:
send a section divider that is a selectable link for retrieving additional results modified in rank by the social context information.

* * * * *